(12) United States Patent
Swinbanks et al.

(10) Patent No.: US 6,487,061 B1
(45) Date of Patent: Nov. 26, 2002

(54) ELECTROMAGNET SUPPORT SYSTEM

(75) Inventors: Malcolm A. Swinbanks, Cambridge (GB); Christopher E. Ruckman, Alexandria, VA (US)

(73) Assignee: VSSI Commercial, Inc., Alexandria, VA (US)

( * ) Notice: Subject to any disclaimer, the term of this patent is extended or adjusted under 35 U.S.C. 154(b) by 0 days.

(21) Appl. No.: 09/492,827

(22) Filed: Jan. 27, 2000

(51) Int. Cl.$^7$ .............................................. H01H 47/00
(52) U.S. Cl. ....................................... 361/143; 361/160
(58) Field of Search ................................ 361/143, 160, 361/115

(56) References Cited

U.S. PATENT DOCUMENTS

| | | | |
|---|---|---|---|
| 4,083,433 A | 4/1978 | Geohegan, Jr. et al. ...... 188/1 B |
| 5,011,108 A | * 4/1991 | Chen et al. ................... 248/550 |
| 5,022,628 A | 6/1991 | Johnson et al. .............. 248/638 |
| 5,126,641 A | 6/1992 | Putman et al. ............... 318/128 |
| 5,133,527 A | 7/1992 | Chen et al. ................... 248/550 |
| 5,236,186 A | 8/1993 | Weltin et al. ................. 267/140 |
| 5,275,388 A | 1/1994 | Kobayashi et al. .... 267/140.14 |
| 5,291,967 A | 3/1994 | Aoki ........................... 180/312 |
| 5,385,217 A | 1/1995 | Watanabe et al. ............ 188/267 |
| 5,387,851 A | 2/1995 | Nuscheler et al. ........... 318/135 |
| 5,471,802 A | * 12/1995 | Yano et al. .................. 52/126.6 |
| 5,827,095 A | 10/1998 | Mantere ......................... 440/6 |
| 6,036,162 A | * 3/2000 | Hayashi ....................... 248/550 |
| 6,116,179 A | 9/2000 | Swinbanks et al. .......... 114/269 |
| 6,127,757 A | 10/2000 | Swinbanks .................. 310/90.5 |

\* cited by examiner

*Primary Examiner*—Stephen W. Jackson
(74) *Attorney, Agent, or Firm*—Dickstein Shapiro Morin & Oshinsky LLP

(57) ABSTRACT

A compliant structure, such as a rubber pad, is used to simplify the resonance pattern of a vibrating object. According to one aspect of the invention, a support system is provided with a device for applying electromagnetic forces to the vibrating object, and the compliant structure is used to support the electromagnetic device. The electromagnetic device is positively controlled as a function of (A) the position of the vibrating object and (B) the position of the electromagnet. The compliant structure may also be used to further attenuate high frequency vibration transmission. According to one aspect of the invention, the compliant structure permits some rocking and/or rotational motion of the electromagnet to simplify the vibration transmission mechanism. According to another aspect of the invention, the compliant structure operates as a slightly-damped stiff spring in the axial direction of the electromagnet.

21 Claims, 3 Drawing Sheets

ELECTROMAGNET SUPPORT SYSTEM

BACKGROUND OF THE INVENTION

1. Field of the Invention

The present invention relates to electromagnetic support systems, including systems for magnetically levitating, suspending, constraining, and/or isolating vibrating objects.

2. Discussion of the Related Art

Electromagnetic support systems have a wide variety of uses. They may be employed, for example, to support vibrating mechanical equipment in marine vessels and other apparatuses. U.S. Pat. No. 5,022,628, for example, describes a system of electromagnets and sensors for attenuating vibrations in a flexible machinery raft.

Electromagnetic support systems may also be used to constrain rotating shafts, to provide stable levitation for transportation systems, and to support precision measuring equipment, for example, and to attenuate acoustic vibrations that would otherwise be transmitted to connected structures. Other examples of electromagnetic support systems are provided in U.S. Pat. Nos. 5,387,851 (Nuscheler et al.), 5,291,967 (Aoki), 5,126,641 (Putman et al.), and 5,011,108 (Chen et al.).

In general, there is a need in the art for electromagnetic support systems that provide relatively high vibration attenuation performance. In addition, there is a need for electromagnetic support systems that have relatively low mechanical and signal processing requirements.

SUMMARY OF THE INVENTION

The disadvantages of the prior art are overcome to a great extent by the present invention.

The present invention relates to a support system that has at least one device for applying electromagnetic forces between first and second objects, and an elastomeric structure (such as a rubber pad) for supporting the electromagnetic device. In a preferred embodiment of the invention, the electromagnetic device is positively controlled as a function of (A) the position of the first object with respect to the second object and (B) the position of the electromagnetic device with respect to the second object.

According to one aspect of the invention, an elastomeric pad structure is provided for each electromagnet. In a preferred embodiment of the invention, there may be a large number of electromagnets. All of the electromagnets may be individually and dynamically controlled by the same controller.

According to another aspect of the invention, sensors are used to provide data to the controller. The sensors provide information representative of the relative positions and/or movements of the electromagnets.

The present invention also relates to the use of elastomeric connectors or other compliant devices (such as coil springs, pneumatic springs, or magnetic springs) to simplify the resonance patterns of vibrating objects. Simplifying the vibrational resonance patterns makes it easier to use signal processing to dynamically attenuate the remaining vibrations. The compliant devices may also be used to reduce the intensity of high frequency vibration transmission.

In a preferred embodiment of the invention, the compliant connector devices are formed of hard rubber. Such devices are economical, effective, easy to install, and durable.

According to another aspect of the invention, each compliant device resembles a lightly-damped but stiff spring. At high frequencies, the impedance mismatch between a massive magnet and a lightly-damped spring is greater than between a massive magnet and a heavily-damped spring. Consequently, high frequency vibration transmission is attenuated more effectively when the inherent damping associated with the compliant device is relatively low.

According to yet another aspect of the invention, the compliant devices are configured to permit rocking and/or rotational motion of the magnet relative to the hull. In particular, the devices are constructed such that rocking and/or rotational motions are not transmitted into the hull.

The present invention also relates to a method of supporting a vibrating object, such as a machiery raft, a rotating shaft, etc., with respect to a fixed object, such as a ship hull, an aircraft housing, or the floor of a factory.

An object of the invention is to provide compliant mounts for an electromagnetic support system. The compliant mounts, which may be formed of hard rubber, simplify the resonance pattern of the associated electromagnets, which makes it relatively easy to eliminate vibrations that would otherwise be transmitted to a connected structure. The present invention also may be used to simplify the dominant coupling and vibration transmission mechanism between the electromagnets and the connected structure (such as a hull).

Another object of the invention is to provide an electromagnetic support system that provides improved acoustic insulation. The invention may be used to reduce noise levels. It also may be used to prevent structural fatigue that might otherwise be caused by vibrations in the mechanical components of the system.

Another object of the invention is to provide an acoustic attenuation system with relatively uncomplicated signal processing requirements.

These and other features and advantages of the invention will become apparent from the following detailed description of preferred embodiments.

DETAILED DESCRIPTION OF PREFERRED EMBODIMENTS

Figure 1:
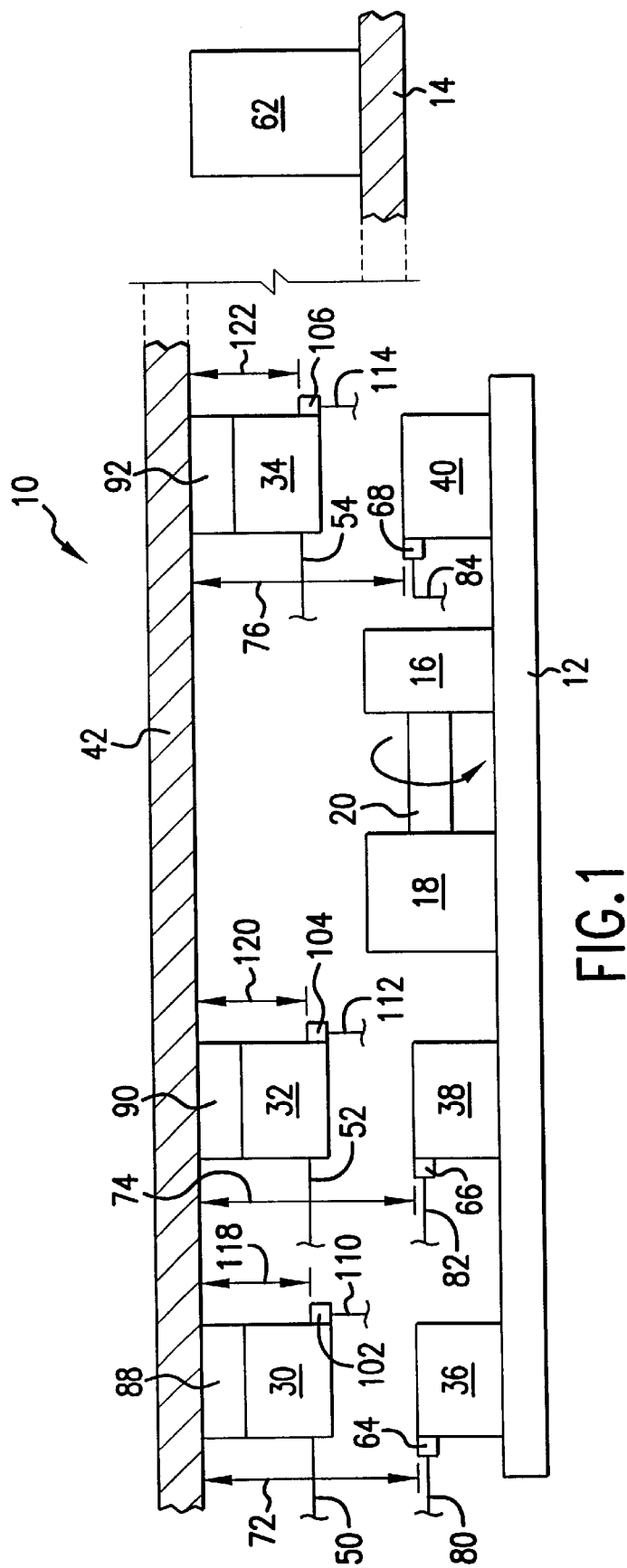
FIG. 1 is a side view of an electromagnetic support system constructed in accordance with the present invention.

Referring now to the drawings, where like reference numerals designate like elements, there is shown in FIG. 1 a system 10 for supporting a flexible machinery raft or other support structure 12 with respect to a ship hull 14. The raft 12 may be used, for example, to support a motor 16 and a pump 18. The motor 16 may be connected to the pump 18 by a rotating drive shaft 20. In operation, vibrations generated by the machinery 16–20 are transmitted to the raft 12.

The support system 10 may be used to damp or cancel out the vibrations in the raft 12. In particular, the support system 10 may be used to reduce the amplitude of acoustic vibrations that would otherwise be transmitted to the ship hull 14.

The support system 10 may also be used to reduce flexing of the raft 12, to thereby prevent misalignment of the machinery 16–20.

The illustrated support system 10 includes a two-dimensional array of opposed electromagnets 30, 32, 34 and metal armatures 36, 38, 40. For the sake of clarity of illustration, only three pairs of opposed electromagnets 30–34 and armatures 36–40 are shown in FIG. 1—three electromagnets 30–34 located directly above three lower armatures 36–40. The other electromagnet/armature pairs forming the two-dimensional array are hidden from view in FIG. 1 behind the illustrated electromagnets 30–34 and armatures 36–40. In practice, a large number of electromagnet/armature pairs (more than three pairs) may be used to support the raft 12. The operation of the additional, unillustrated electromagnet/armature pairs may be the same as that of the illustrated electromagnets and armatures 30–40.

In operation, the electromagnets 30–34 generate upwardly directed magnetic forces. The forces are applied to the armatures 36–40 to levitate the raft 12 (that is, to pull the raft 12 toward a support portion 42 of the ship hull 14). The illustrated support portion 42 may be an integral part of the hull 14, or the support portion 42 may be integrally connected to the hull 14. The armatures 36–40 are drawn toward the hull support portion 42 by the magnetic forces of the electromagnets 30–34. The magnetic forces are generated by electrical currents supplied through lines 50, 52, 54.

A suitable controller 62 is provided for dynamically and individually controlling the currents supplied to the electromagnets 30–34. By controlling the currents in the lines 50–54, the controller 62 is able to dynamically and individually control the magnitudes of the forces generated by the electromagnets 30–34.

The controller 62 responds to data signals from lower transducers 64, 66, 68. The transducers 64–68 are fixed with respect to the armatures 36–40. The transducers 64–68 generate signals that are representative of the distances 72, 74, 76 between the armatures 36–40 and the ship hull support portion 42. The transducers 64–68 may include optical distance sensors, for example. The transducers 64–68 may also include motion sensors to generate signals that are representative of the accelerations of the armatures 36–40, if desired. The signals generated by the transducers 64–68 are transmitted to the controller 62 by suitable signal lines 80, 82, 84.

In response to the signals from the transducers 64–68, the controller 62 individually controls the electromagnets 30–34 to (1) maintain the alignment of the equipment 16–20 on the raft 12 and/or (2) damp the vibrations of the raft 12 to reduce the amplitude of vibrations transmitted to the hull 14 through the support portion 42. In a preferred embodiment of the invention, the forces generated by the electromagnets 30–34 are linearly proportional to the respective outputs of the controller 62. The transducers 64–68, the controller 62 and the electromagnets 30–34 form a first multi-channel control loop.

The first control loop may employ a modal matrix decomposition function to identify wave functions within the flexible, vibrating raft 12. Once the wave functions are identified, electrical currents corresponding to an inverse modal matrix configuration are supplied to the electromagnets 30–34 to substantially cancel out the raft vibrations. A suitable signal processing technique for the first control loop is described in U.S. Pat. No. 5,022,628, the entire disclosure of which is incorporated herein by reference. Other signal processing techniques may also be used, if desired.

The armatures 36–40 may be rigidly and integrally connected to the raft 12. For example, the armatures 36–40 may be connected to the raft 12 by steel bolts (not illustrated). Alternatively, the armatures 30–34 may be welded to the raft 12. The electromagnets 30–34, on the other hand, are elastomerically connected to the support portion 42 by hard rubber pads 88, 90, 92. The rubber pads 88–92 are interposed between the electromagnets 30–34 and the ship hull 14. It is preferable, but not essential, to place the more massive components (i.e., the electromagnets 30–34) on the hull side (i.e., the same side as the compliant pads 88–92) to maximize the impedance mismatch and hence the effectiveness of the compliant elements 88–92 at higher frequencies. The pads 88–92 may be used to simplify the vibration resonance patterns of the electromagnets 30–34, and the pads 88–92 provide other advantages, as described in more detail below.

Figure 2:
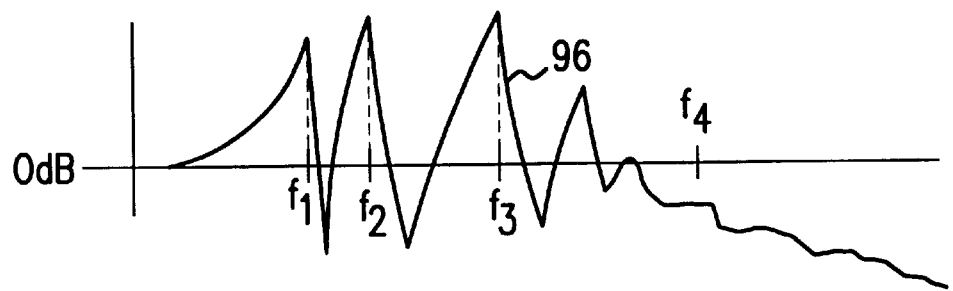
FIGS. 2 and 3 are resonance diagrams, showing relationships between vibration amplitude and vibration frequency, for explaining some of the advantages of the present invention.

To understand the advantages of the present invention, it is useful to consider how the support system would be constructed and operated without the elastomeric pads 88–92. If the pads 88–92 were not used, and the electromagnets 30–34 were instead rigidly attached to the support portion 42 by bolts or welds, there still would be some vibration of the electromagnets 30–34 with respect to the hull 14. The electromagnets 30–34 would tend to vibrate according to complex resonance patterns of the type represented by line 96 in FIG. 2. That is, the electromagnets 30–34 would tend to vibrate at high amplitudes at discrete frequencies $f_1$, $f_2$, $f_3$.

It would be difficult to use signal processing techniques to cancel out or eliminate the high amplitude vibrations (at frequencies $f_1$, $f_2$, $f_3$) without creating high amplitude vibrations at other frequencies. Consequently, it would be difficult to prevent high amplitude vibrations from being transmitted to the ship hull 14. The high amplitude vibrations that would be transmitted into the hull 14 (through the support portion 42) could cause undesirable noise problems. In addition, they could degrade the rigid connections and/or other mechanical devices connected to the hull 14.

Vibration problems associated with the electromagnets 30–34 would be especially pronounced where there are restrictions on the weight and size of the rigid connections. Consequently, the elastomeric connections 88–92 of the present invention are especially advantageous in situations where large, complicated rigid connections for the electromagnets 30–34 would be undesirable.

Figure 3:
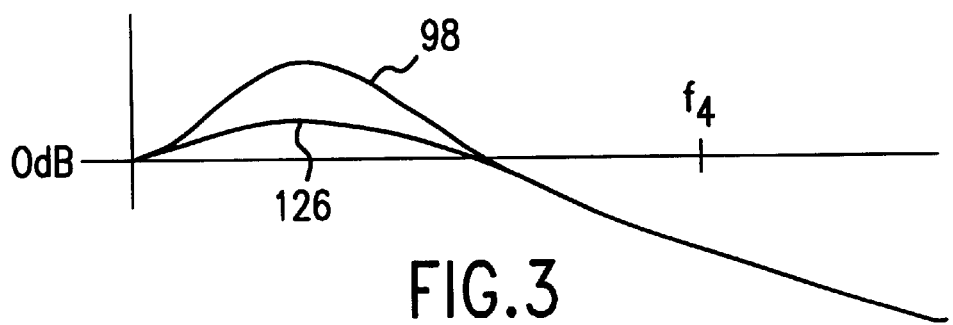

Thus, an advantage of the elastomeric pads 88–92 is that they cause the electromagnets 30–34 to have smooth, simplified resonance patterns of the type shown by line 98 in FIG. 3. By themselves, the elastomeric connections 88–92 would not necessarily eliminate altogether the high amplitude vibrations in the electromagnets 30–34. Nevertheless, the pads 88–92 may be employed to cause the vibrational resonance patterns for the electromagnets 30–34 to be more smoothly defined, predictable and manageable. The pads 88–92 also cause the highest amplitude vibrations to be at lower frequencies. That is, the pads 88–92 shift the curves of FIGS. 2 and 3 to the left, so that the resonant vibrations occur generally at lower frequencies. Smoothing out the resonance patterns of the electromagnets 30–34 and shifting the patterns to lower frequencies make it easier to cancel out high amplitude vibrations by signal processing.

According to a preferred embodiment of the invention, a second multi-channel control loop is provided to further attenuate the vibrations of the electromagnets 30–34. The electromagnets 30–34 are attached to the elastomeric pads 88–92. Since the pads 88–92 tend to provide simpler, broader resonance patterns at lower frequencies, the signal processing for the second control loop may be relatively uncomplicated. The second control loop operates to damp and suppress vibrations of the attached electromagnets 30–34.

Thus, the support system 10 includes upper transducers 102, 104, 106 that are fixed with respect to the electromagnets 30–34. The upper transducers 102–106 generate data signals on lines 110, 112, 114. The upper transducers 102–106 may have optical sensors. Alternatively, the upper transducers 102–106 may include pressure sensors embedded in the rubber pads 88–92 for sensing the compression of the rubber pads 88–92. The signals generated by the upper transducers 102–106 may be representative of the respective distances 118, 120, 122 between the upper transducers 102–106 and the ship hull support portion 42. The signals may also be representative of the accelerations of the upper transducers 102–106, if desired. The signals are transmitted to the controller 62 via the lines 110–114.

The controller 62 processes the signals from the lines 110–114 concurrently with the processing of the signals from the lines 80–84. As an output, the controller 62 applies time-varied currents to the electromagnets 30–34 to reduce the amplitude of the vibrations of the electromagnets 30–34. In operation, the vibrations of the electromagnets 30–34 may be attenuated to the extent represented by line 126 in FIG. 3. In a preferred embodiment of the invention, the amplitudes of what would otherwise be the most intense resonant vibrations (at frequencies $f_1$, $f_2$, $f_3$) may be reduced by twenty or more decibels.

Another advantage of the present invention is that the pads 88–92 reduce the intensity of high frequency vibration transmission (for example, at frequencies greater than $f_4$) without the use of additional signal processing at those high frequencies. The pads 88–92 provide an additional impedance discontinuity at high frequencies which tends to impede or attenuate the transmission of vibrations to the hull.

The present invention is not limited to the preferred embodiments shown and described herein. In particular, the invention may be used with a wide variety of systems and apparatuses, including but not limited to ships of all kinds, fixed wing aircraft, helicopters, measuring instruments, and manufacturing equipment. The invention may also be used to isolate, acoustically insulate, and constrain a wide variety of objects, including but not limited to platforms, rotating shafts, mechanical and/or electronic devices, and vibrating pipes and other connections.

Figure 4:
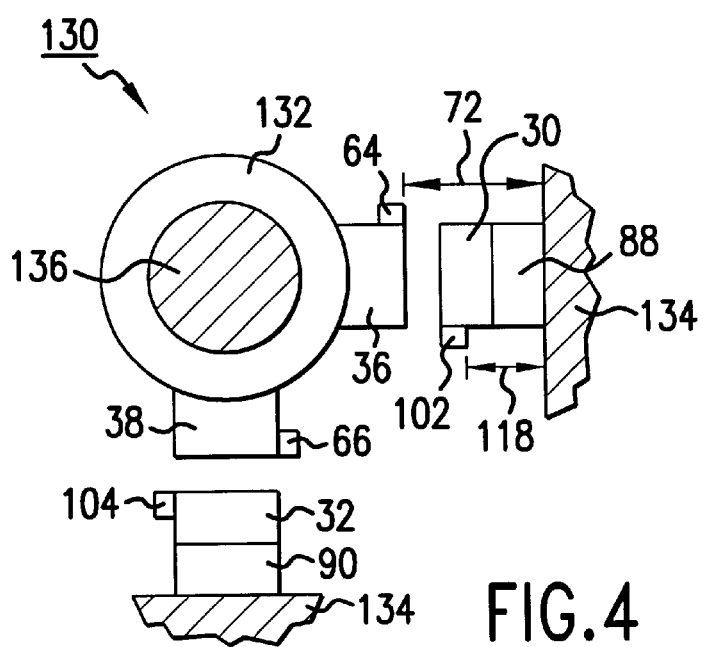
FIG. 4 is a side view of another support system constructed in accordance with the present invention.

FIG. 4 shows a system 130 for supporting a bearing 132 with respect to a housing 134. The housing 134 may be a ship hull, a helicopter housing, or a wide variety of other objects. The bearing 132 may be used to constrain a rotating shaft 136, for example. The support system 130 may be used to prevent high amplitude acoustic vibrations from being transmitted from the shaft 136 to the housing 134.

The support system 130 includes a three-dimensional array of opposed electromagnets 30, 32 and armatures 36, 38. For the sake of clarity of illustration, only two pairs of opposed electromagnets 30, 32 and armatures 36, 38 are shown in FIG. 4—two outer electromagnets 30, 32 aligned with two inner armatures 36, 38. In operation, the electromagnets 30, 32 generate attractive magnetic forces which are applied to the armatures 36, 38 to maintain the shaft 136 in the desired position with respect to the housing 134.

The magnitudes of the magnetic forces are individually controlled by varying the electrical currents supplied to the electromagnets 30, 32 by a common controller 62 (not shown in FIG. 4). By controlling the applied currents, the controller 62 is able to dynamically and individually control the magnitudes of the forces generated by the electromagnets 30, 32. The controller 62 may be a programmed microprocessor, for example.

The controller 62 responds to data signals from inner transducers 64, 66 that are fixed with respect to the armatures 36, 38. The transducers 64, 66 generate signals that are representative of the radial distances 72 between the armatures 36, 38 and the housing 134. In response to the signals from the inner transducers 64, 66, the controller 62 individually controls the electromagnets 30, 32 to (1) maintain the desired position of the shaft 136 and/or (2) buffer the vibrations that would otherwise be transmitted to the housing 134.

The electromagnets 30, 32 are elastomerically connected to the housing 134 by hard rubber pads 88, 90. The pads 88, 90 simplify the vibrational resonance patterns of the electromagnets 30, 32, and generally reduce the resonant frequencies of the amplitude peaks, so that the vibrations of the electromagnets 30, 32 can be relatively easily canceled out by signal processing (by the controller 62).

Figure 5:
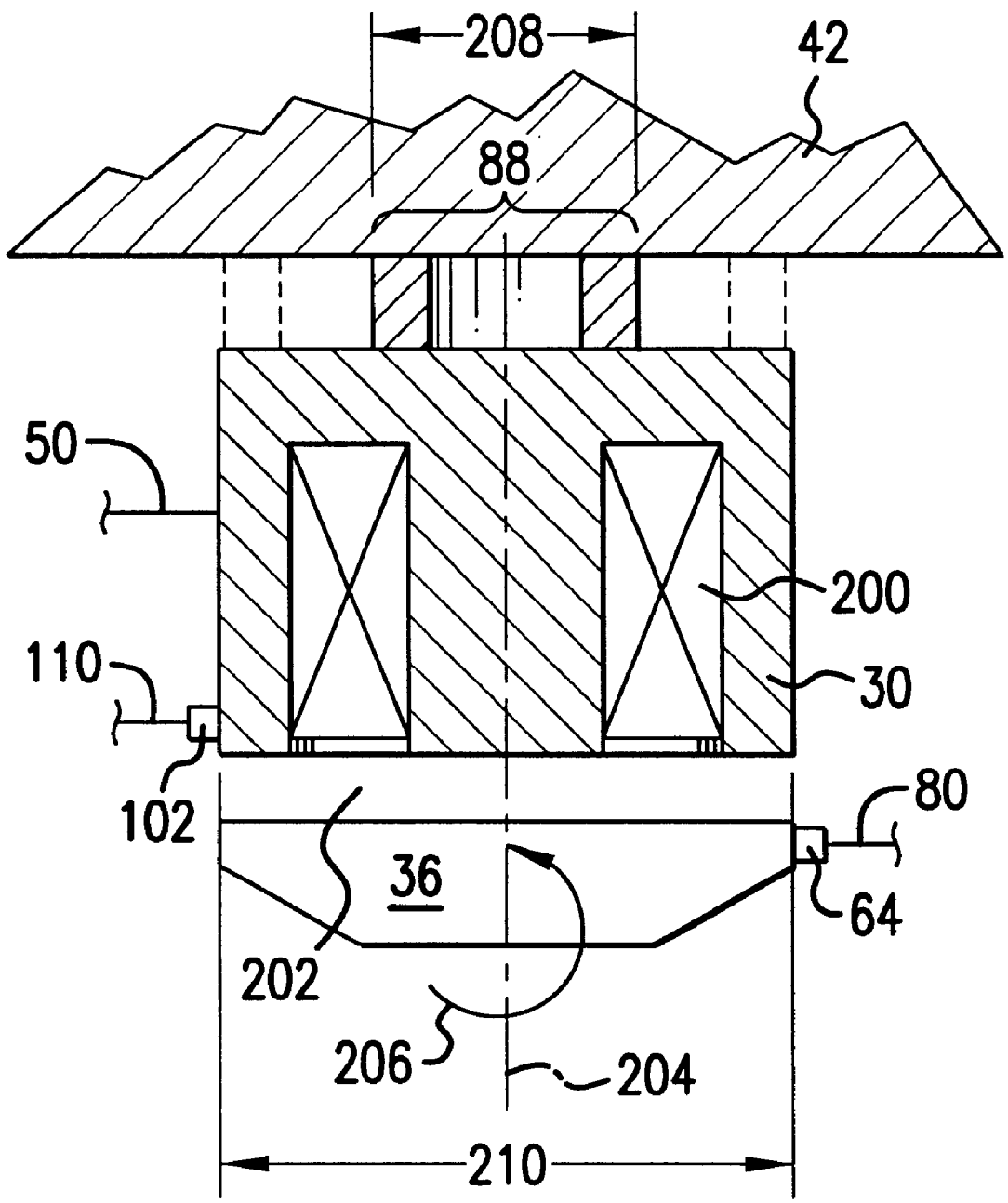
FIG. 5 is a cross sectional view of an electromagnet/armature pair constructed in accordance with the present invention.

FIG. 5 provides a detailed view of an electromagnet/armature pair for the system 10 shown in FIG. 1. If desired, each electromagnet/armature pair in the two dimensional array of the FIG. 1 system may be constructed as illustrated in FIG. 5. In addition, the electromagnet/armature pairs shown in FIG. 4 may be constructed as shown in FIG. 5. The present invention should not be limited, however, to the specific structures and instrumentalities shown and described in detail herein.

Referring now to FIG. 5, the electromagnet 30 is electromagnetically coupled to the armature 36 such that rocking and/or rotational motions of the armature 36 are transmitted into the electromagnet 30. High frequency rocking and/or rotational motions transmitted across the electromagnetic gap 202 are not readily controlled by applying respective signals to the electromagnetic coil 200 through the control line 50. This is because the electromagnetic forces produced by the coil 200 are active only in the linear direction (that is, the forces are active only in the direction of axis 204).

Applicants have found that by suitably designing the geometry of the compliant mounting structure 88, it is possible to ensure that the rocking and/or rotational motions induced in the electromagnet 30 are not readily transmitted into the support component 42. When the electromagnet 30 is suspended from the support component 42 (as shown in FIGS. 1 and 5), the compliant structure 88 operates in tension. If the electromagnet 30 is suspended from points near its central axis 204 (as shown in solid lines in FIG. 5), then the electromagnet 30 can be maintained in a stable manner but is largely free to rock and rotate the direction of arrow 206). The rocking and/or rotating motions are not transmitted upwards into the support component 42 through the suspension structure (i.e., the pad 88).

If the electromagnet 30 were suspended from a number of points located around its outside perimeter (as shown in dotted lines in FIG. 5), then the rocking and/or rotational motion (206) transmitted across the electromagnetic gap 202 could be transmitted into the support component 42 which would be undesirable. Thus, in the illustrated embodiment, the compliant element 88 is in the form of a hollow cylinder with a relatively small moment of inertia. The outer diameter 208 of the compliant cylinder 88 is substantially less than the width 210 of the electromagnet 30 such that the moment of inertia of the compliant element 88 is substantially less than that of the comparative structure shown in dotted lines in FIG. 5.

The present invention should not be limited to the preferred embodiments shown and described herein. Other compliant structures with reduced tendency to transmit rocking and/or rotational vibrations into the support component 42 may also be used instead of the illustrated structure 88, if desired.

According to the present invention, the compliant mounting structure 88 can be used both to simplify the vibration transmission mechanism of the system 10, as well as to reduce the absolute magnitude of such transmitted vibration. To avoid extreme rotational motion of the electromagnet 30, a suitable rotational constraint may be supplied. But the constraint can be designed to be much less stiff than the stiffness of the compliant structure 88 in tension. In other words, the compliant structure 88 may be stiffer in the axial direction 204 than it is in the rotational direction 206.

An advantage of the present invention is that the compliant mounting structure 88 enables the resonance patterns of the electromagnet 30 to be simplified. In addition, the structure 88 simplifies the dominant coupling and transmission mechanisms.

With regard to the foregoing discussion, it should be noted that the compliant mounting structure 88 may be made of a comparatively hard material, such as hard rubber. In the system 10 shown in FIG. 1, static displacements of the electromagnets 30–34 with respect to the support structure 42 would be almost undetectable, but the dynamic effects take a predictable and favorable form.

The purpose of the compliant structure 88 is to provide an impedance discontinuity which attenuates the transmission of vibration from the electromagnet 30 into the support component 42. In this regard, the compliant structure 88 may operate most effectively when it resembles a lightly-damped stiff spring, rather than a heavily-damped stiff spring. At high frequencies, the impedance mismatch between a relatively massive magnet 30 and a lightly-damped spring is much greater than between a massive magnet and a heavily-damped spring. Therefore, high frequency vibration transmission is attenuated more effectively when the inherent damping associated with the compliant structure 88 is low.

A consequence of employing a compliant structure that resembles a lightly-damped spring is that the principal resonance of the magnet 30 is also lightly-damped and therefore of potentially high amplitude. With the present invention, the control system 62 may be used to damp such potentially high amplitudes. Very high damping at resonant frequencies can be supplied entirely by the second control loop, without compromising the natural high frequency passive impedance mismatch which exists between the electromagnet 30 and the compliant structure 88.

The present invention should not be limited to the preferred embodiments shown and described herein. For example, although the invention has been described in terms of electromagnets that are individually associated with armatures, it may also be possible to use paired electromagnets that attract or repel each other. Moreover, permanent magnets may be used in the magnet pairs or as an alternative to the armatures. The compliant rubber pads 88–92 may be compressed between the associated electromagnets and the housing 14, 134, or the compliant connections alternatively may be installed in tension. The compliant connections may be used to suspend the electromagnets from a fixed object, for example. The tension members may be formed of elastomeric material, coiled springs, pneumatic springs, and the like.

The above descriptions and drawings are only illustrative of preferred embodiments which achieve the features and advantages of the present invention, and it is not intended that the present invention be limited thereto. Any modification of the present invention which comes within the spirit and scope of the following claims is considered part of the present invention.

What is claimed as new and desired to be protected by Letters Patent of the United States is:

1. An electromagnetic system for supporting a first object with respect to a second object, said system comprising:
    an electromagnetic device for applying a magnetic force between the first and second objects;
    an elastomeric structure for elastomerically supporting said electromagnetic device with respect to the second object; and
    a controller for controlling said electromagnetic device as a function of the position of the first object with respect to the second object and as a function of the position of said electromagnetic device with respect to the second object.

2. The system of claim 1, wherein said electromagnetic device includes an electromagnet opposed to an armature.

3. The system of claim 2, wherein said controller is operatively connected to said electromagnet.

4. The system of claim 3, wherein said elastomeric structure is formed of hard rubber.

5. The system of claim 4, wherein said elastomeric structure permits rocking and/or rotational movement of said electromagnet relative to said second object.

6. The system of claim 5, wherein said elastomeric structure operates as a lightly-damped stiff spring.

7. The system of claim 4, further comprising a sensor for generating signals representative of the position of the first object with respect to the second object, said sensor being fixed with respect to said first object.

8. The system of claim 7, further comprising a second sensor for generating signals representative of the position of said electromagnet.

9. The system of claim 1, further comprising a plurality of dynamically controlled opposed electromagnets for applying magnetic forces between the first and second objects, said electromagnets being operatively connected to said controller.

10. A method of supporting a vibrating first object with respect to a second object, said method comprising the steps of:
    using an electromagnetic device to apply a magnetic force between said first and second objects;
    elastomerically supporting said electromagnetic device with respect to said second object; and
    controlling said electromagnetic device as a function of the position of said first object with respect to said second object and as a function of the position of said electromagnetic device with respect to said second object.

11. The method of claim 10, wherein said first object is a machinery raft.

12. The method of claim 11, wherein said second object is a ship hull.

13. The method of claim 10, wherein said first object is a rotating shaft.

14. The method of claim 13, wherein said first object is a propeller shaft for a helicopter.

15. The method of claim 13, wherein said first object is a propeller shaft for a ship.

16. The method of claim 15, wherein said second object is a ship hull.

17. A system for supporting a vibrating object, said system comprising:

an electromagnet for applying a net magnetic force against the vibrating object; a compliant structure for supporting said electromagnet with respect to a second object;

a first control loop for controlling said electromagnet as a function of the position of the vibrating object with respect to the second object;

a second control loop for controlling vibrations of said electromagnet; and a controller for simultaneously operating said first and second control loops.

18. The system of claim 17, wherein said compliant structure is formed of elastomeric material.

19. The system of claim 18, wherein said first control loop includes a first sensor for generating signals representative of the position of said vibrating object.

20. The system of claim 19, wherein said second control loop includes a second sensor for generating signals representative of the position of said electromagnet.

21. The system of claim 20, further comprising signals lines for connecting said first and second sensors to said controller.

* * * * *